(12) United States Patent
Goarant

(10) Patent No.: US 11,969,933 B2
(45) Date of Patent: Apr. 30, 2024

(54) MULTI-CHANNEL CO-EXTRUSION PREFORMER HAVING A MONOLITHIC THROUGH STIFFENER WHICH CAN BE OBTAINED BY ADDITIVE MANUFACTURING

(71) Applicant: COMPAGNIE GENERALE DES ETABLISSEMENTS MICHELIN, Clermont-Ferrand (FR)

(72) Inventor: Christophe Goarant, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 249 days.

(21) Appl. No.: 17/631,081

(22) PCT Filed: Jul. 28, 2020

(86) PCT No.: PCT/FR2020/051387
§ 371 (c)(1),
(2) Date: Jan. 28, 2022

(87) PCT Pub. No.: WO2021/019182
PCT Pub. Date: Feb. 4, 2021

(65) Prior Publication Data
US 2022/0297366 A1    Sep. 22, 2022

(30) Foreign Application Priority Data

Jul. 30, 2019 (FR) ..................................... 1908691

(51) Int. Cl.
*B29C 48/30* (2019.01)
*B29C 48/21* (2019.01)
(Continued)

(52) U.S. Cl.
CPC ............ *B29C 48/304* (2019.02); *B29C 48/21* (2019.02); *B29C 48/2566* (2019.02);
(Continued)

(58) Field of Classification Search
CPC .... B29C 48/21; B29C 48/2566; B29C 48/304
See application file for complete search history.

(56) References Cited

U.S. PATENT DOCUMENTS

| | | |
|---|---|---|
| 6,294,119 B1 | 9/2001 | Nakamura |
| 2005/0208167 A1 | 9/2005 | You et al. |
| 2020/0215737 A1 | 7/2020 | Wichmann et al. |

FOREIGN PATENT DOCUMENTS

| | | |
|---|---|---|
| DE | 102018222081 A1 | 7/2019 |
| EP | 0925903 A1 | 6/1999 |

(Continued)

OTHER PUBLICATIONS

International Search Report dated Nov. 2, 2020, in corresponding PCT/FR2020/051387 (6 pages).

*Primary Examiner* — James Sanders
(74) *Attorney, Agent, or Firm* — VENABLE LLP

(57) ABSTRACT

A preformer (1) is designed to extrude jointly a plurality of elastomer mixes in a direction of flow (X1), in order to form a profiled element, the preformer comprising for this purpose, superimposed in a direction of stacking (Z1), transverse to the direction of flow (X1), a first channel (11), a second channel (12) which is separated from the first channel (11) by a first partition (15), then a third channel (13), separated from the second channel (12) by a second partition (16), the preformer also comprising a stiffener (20) formed integrally with the first partition (15) and the second partition (16), and extends through the second channel (12), having a leading edge (21) which splits the flow of elastomer material following the second channel (12).

15 Claims, 11 Drawing Sheets

(51) Int. Cl.
*B29C 48/25* (2019.01)
*B29C 48/70* (2019.01)
*B33Y 80/00* (2015.01)
B29K 21/00 (2006.01)
B29L 30/00 (2006.01)

(52) U.S. Cl.
CPC ...... *B29C 48/25686* (2019.02); *B29C 48/705* (2019.02); *B33Y 80/00* (2014.12); B29K 2021/00 (2013.01); B29L 2030/002 (2013.01)

(56) References Cited

FOREIGN PATENT DOCUMENTS

| | | |
|---|---|---|
| EP | 2520421 A1 | 11/2012 |
| FR | 2861639 A1 | 5/2005 |
| WO | 2019/037901 A1 | 2/2019 |

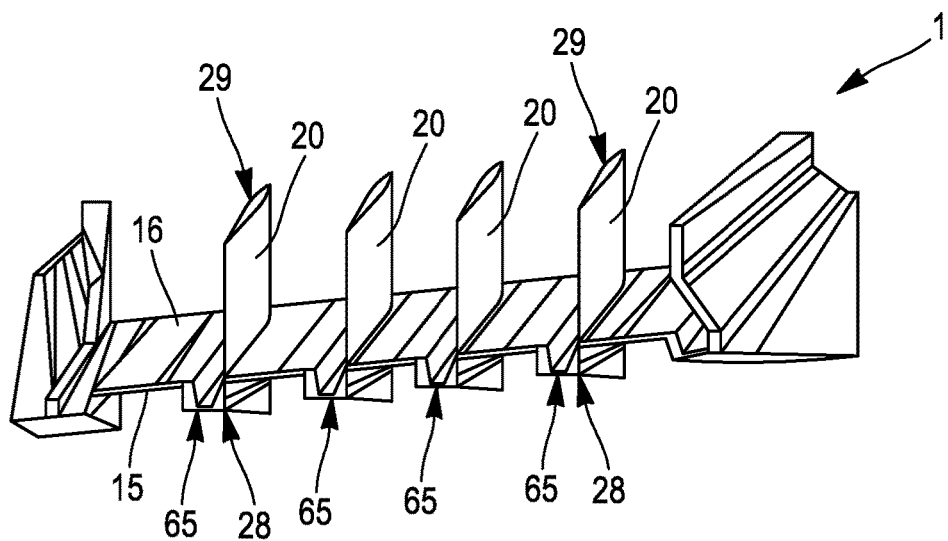
FIG. 15
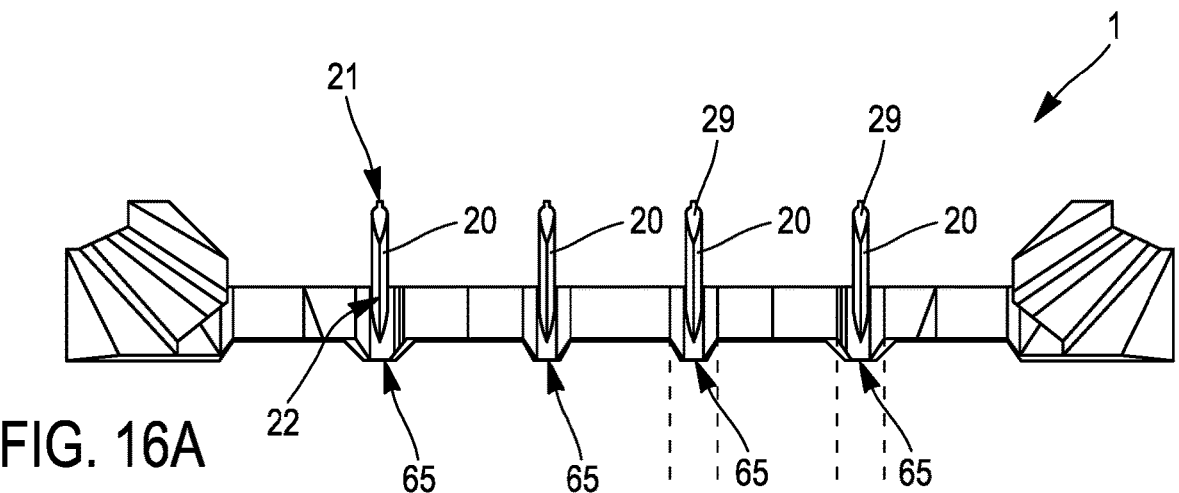
FIG. 16A
FIG. 16B

MULTI-CHANNEL CO-EXTRUSION PREFORMER HAVING A MONOLITHIC THROUGH STIFFENER WHICH CAN BE OBTAINED BY ADDITIVE MANUFACTURING

BACKGROUND

The present invention relates to the field of co-extrusion methods, and more particularly to methods for co-extrusion of complex profiled elements, during which there is simultaneous extrusion through a single die of a plurality of elastomer mixes, i.e. mixes formed on the basis of elastomers, obtained from a plurality of extruders, such as to combine the said elastomer mixes into a profiled element which is known as "complex", since the said profiled element obtained thus has in a single cross-section an assembly of a plurality of intermediate areas, typically an assembly of a plurality of layers, which have distinct compositions corresponding to the plurality of elastomer mixes.

Co-extrusion methods of this type are used in particular to produce in the form of complex profiled elements treads which are destined for the production of tyres.

Methods of this type usually require relatively complex tooling, which, after a head on which the extruders are connected, comprises in particular a preformer comprising a plurality of channels making it possible to convey and form progressively the different elastomer mixes obtained from the extruders, and to make the said elastomer mixes converge towards an outlet which opens into a die, which die provides the cross-section of the profiled element with its definitive form.

In general, tooling of this type is heavy and cumbersome, in particular since it must be able to withstand very high pressures necessary to convey the elastomer mixes, which are very highly viscous, through channels, the cross-section of passage of which can sometimes be relatively narrow, and can thus give rise to significant losses of load.

In addition, tooling of this type is often costly to produce, and above all to develop, since, each time it is wished to experiment with a change of geometry or dimensions of one of the channels of the preformer, it is necessary to machine a corresponding new preformer. In general this machining is carried out by electroerosion, by means of a process of cutting with wire, which is admittedly accurate and makes it possible to produce complex forms, but is relatively lengthy to implement.

Consequently, the objectives of the invention are to eliminate the aforementioned disadvantages, and propose new co-extrusion tooling which is compact, inexpensive and rapid to manufacture, and which limits energy consumption during the extrusion operations.

SUMMARY

The objectives of the invention are achieved by means of a preformer which is designed to extrude jointly a plurality of elastomer mixes in a common direction known as the "direction of flow", in order to assemble the said elastomer mixes into a co-extruded profiled element, the said preformer comprising for this purpose, superimposed in a first direction transverse to the direction of flow, known as the "direction of stacking", a first channel which is designed to convey a first elastomer mix, a second channel which is designed to convey a second elastomer mix, and is separated from the first channel by a first partition, then a third channel which is designed to convey a third elastomer mix, and is separated from the second channel by a second partition, the said preformer being characterised in that it comprises at least one stiffener which is integral with the first partition and the second partition, and extends such as to pass through at least the second channel in the direction of stacking transverse to the direction of flow, thus having, at least in the cross-section of passage of the said second channel, a leading edge which allows the elastomer mix following the second channel, to pass around the said stiffener by dividing up into two sub-flows, which flow, in the said second channel, on both sides of the said leading edge, and thus on both sides of the said stiffener.

Advantageously, the presence of a stiffener according to the invention makes it possible to reinforce and rigidify structurally the partitions delimiting the channels, without however impeding the flow of the elastomer mixes, which makes it possible to produce relatively fine partitions, and thus to reduce the size of the preformer, while maximising the cross-section of passage of the channels in a given tool volume. Thus, it is possible to reduce the losses of load, and therefore carry out the extrusion using a lower supply pressure, which makes it possible to reduce the energy consumption.

In addition, the preformer arrangement proposed by the invention is particularly suitable for manufacture of the said preformer by additive manufacturing, with three-dimensional printing, thus making it possible to produce the preformer rapidly at a lower cost, and if applicable to modify the said preformer locally by carrying out re-machining then additive re-manufacturing, such that it is possible to make the preformer develop easily and rapidly by means of successive iterations during the phase of completion of the machining, without needing to manufacture a complete new preformer each time.

BRIEF DESCRIPTION OF THE FIGURES

Further objectives, characteristics and advantages of the invention will become apparent in more detail from reading the following description and with the aid of the appended drawings, which are provided purely by way of illustration and without limitation and in which:

FIG. 15 illustrates, in an overall view in perspective, a preformer corresponding to the preformer in FIGS. 11 and 12.

FIG. 16A is a view from the front of the preformer in FIG. 15.

FIG. 16B illustrates, in a schematic view from the front, an example of a cross-section of a profiled element which can be obtained from the preformer in FIGS. 15 and 16A.

DETAILED DESCRIPTION

The present invention relates to a preformer 1 forming a part of extrusion tooling, and more globally of an extrusion installation 2.

A preformer 1 of this type is designed to extrude jointly a plurality of elastomer mixes in a common direction X1, known as the "direction of flow" X1, for the purpose of assembling the said elastomer mixes in a co-extruded profiled element 60.

Figure 3:
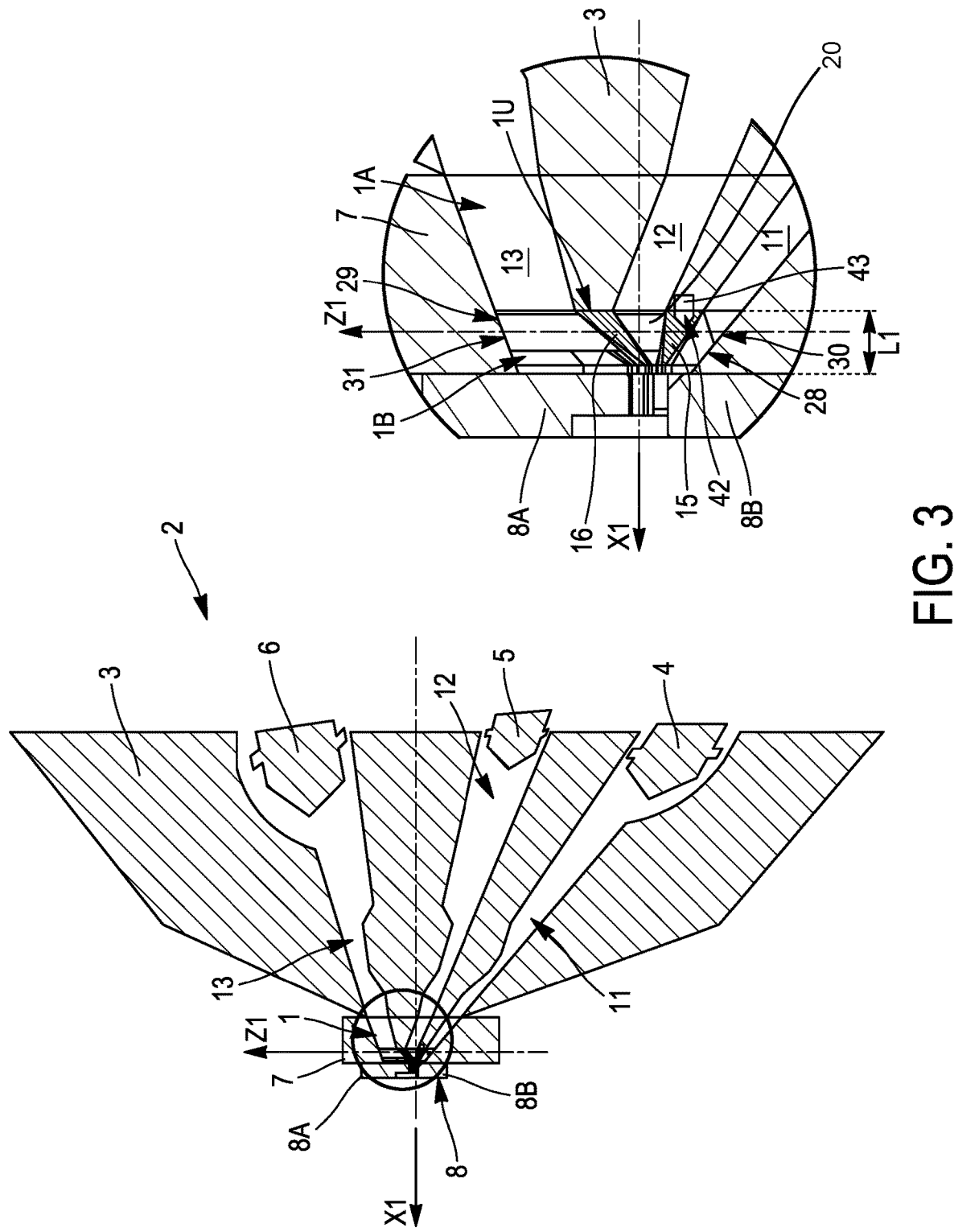
FIG. 3 illustrates, in a partial side view in cross-section, the extraction installation in FIG. 2, with an inset showing an enlargement of the corresponding preformer.
Figure 4:
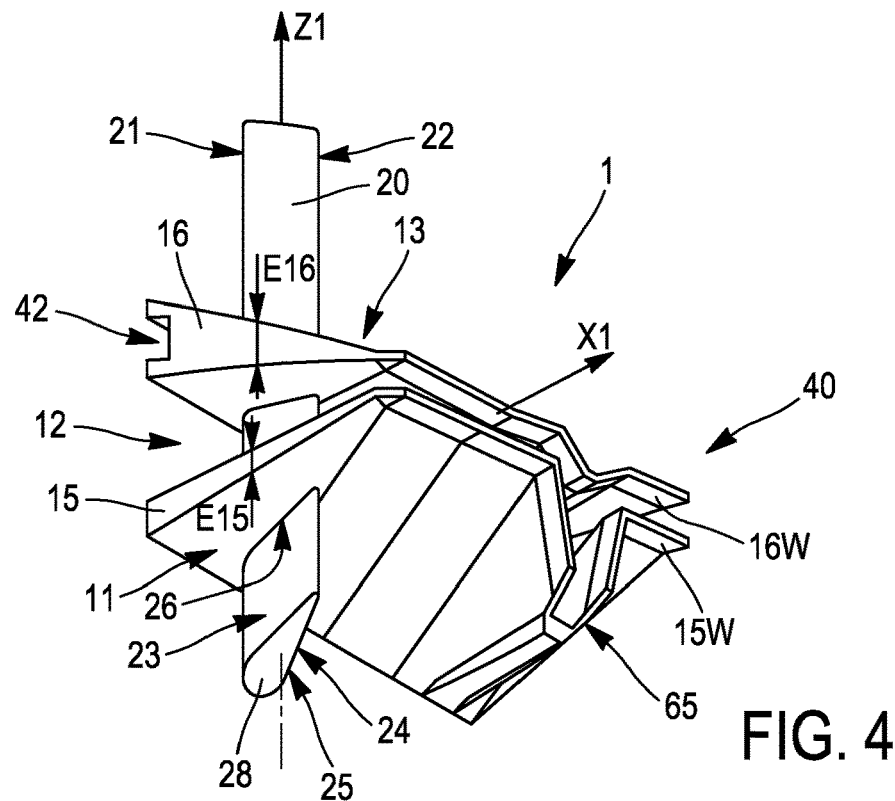
FIG. 4 illustrates, in a detail view in perspective, an elementary module of the preformer in FIG. 1.

In a known manner, and as illustrated in FIG. 3, the extrusion installation 2 comprises a head 3, forming a support on which a plurality of extruders 4, 5, 6 are connected. It will be appreciated that the number of extruders is not limited, and that the invention can relate to an installation 2 comprising for example three, four, five, six, or seven distinct extruders.

Each extruder 4, 5, 6 is designed to supply an elastomer mix, and for this purpose preferably comprises a sheath, which is secured in a sealed manner on the head 3, and in the interior of which at least one extrusion screw, and optionally two counter-rotating extrusion screws, is/are fitted such as to rotate. For convenience of representation, the extruders 4, 5, 6 are assimilated to their respective screws in FIG. 3.

The head 3 makes it possible to convey the elastomer mixes obtained from the extruders 4, 5, 6, which are situated upstream from the head 3 with reference to the direction of flow, as far as the preformer 1, which is connected downstream from the said head 3, at the output from the said head 3.

Preferably, each elastomer mix obtained from a distinct extruder 4, 5, 6 is conveyed through the head 3 and as far as the preformer 1 separately from the other elastomer mixes obtained from the other extruders, without being mixed with the said other elastomer mixes. For this purpose, the head preferably has as many distinct channels 11, 12, 13 as there are extruders 4, 5, 6. These channels of the head 3 each connect the sheath of the extruder 4, 5, 6 concerned, situated upstream, to the input of a corresponding channel 11, 12, 13 of the preformer 1 situated downstream.

For the sake of convenience and standardisation of notation, the references of the channels of the head 3 can be assimilated to the references of the corresponding channels of the preformer 1.

It will be noted that, according to a possible implementation, it can be envisaged for a single extruder 4, 5, 6 to supply a plurality of channels of the preformer. For this purpose, one or a plurality of channels of the head 3 can have branches, which will split the head channel concerned, and, if applicable, can each lead to a distinct channel within the preformer 1.

Figure 1:
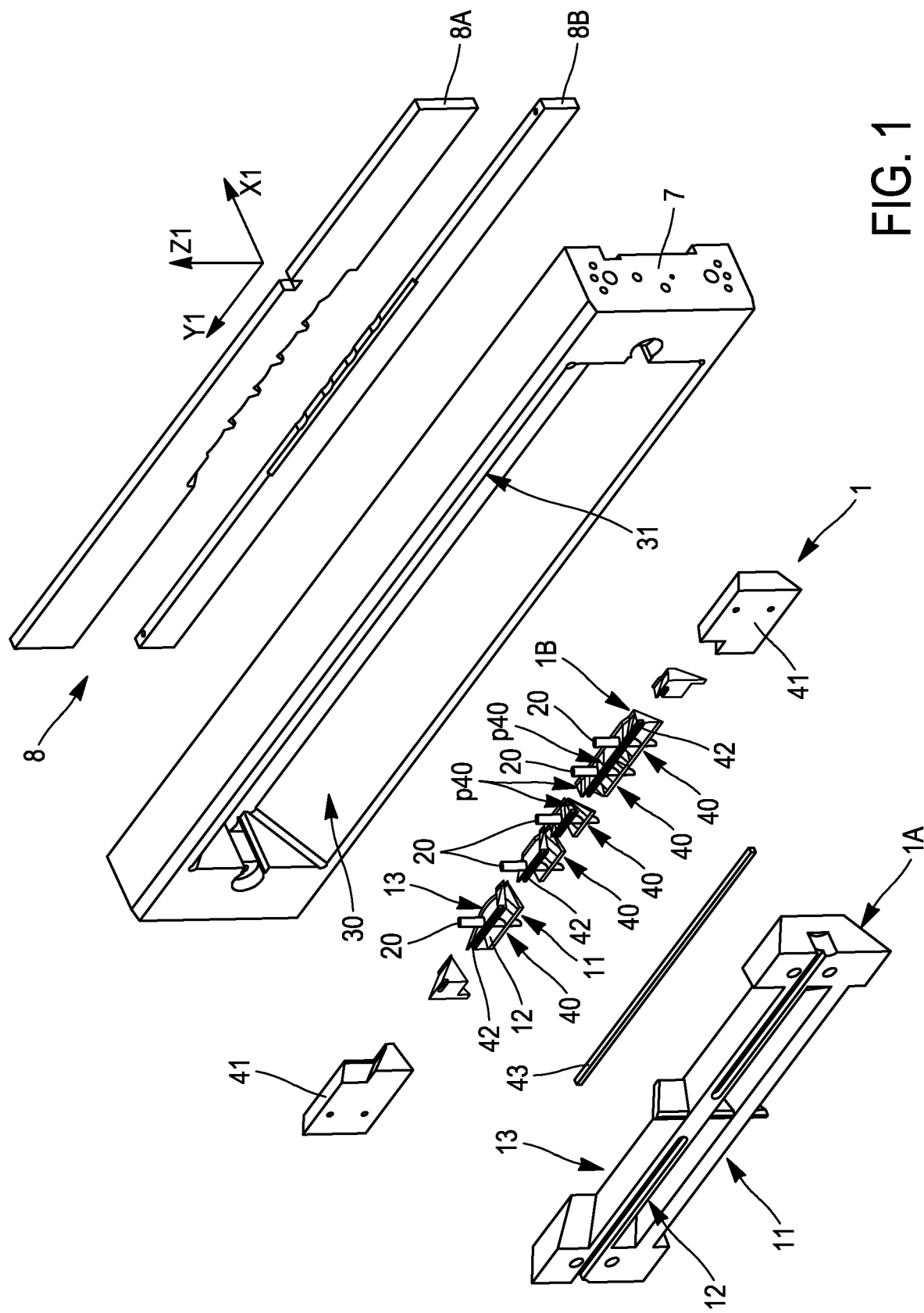
FIG. 1 illustrates, in an exploded view in perspective, extrusion tooling comprising a preformer according to the invention.
Figure 2:
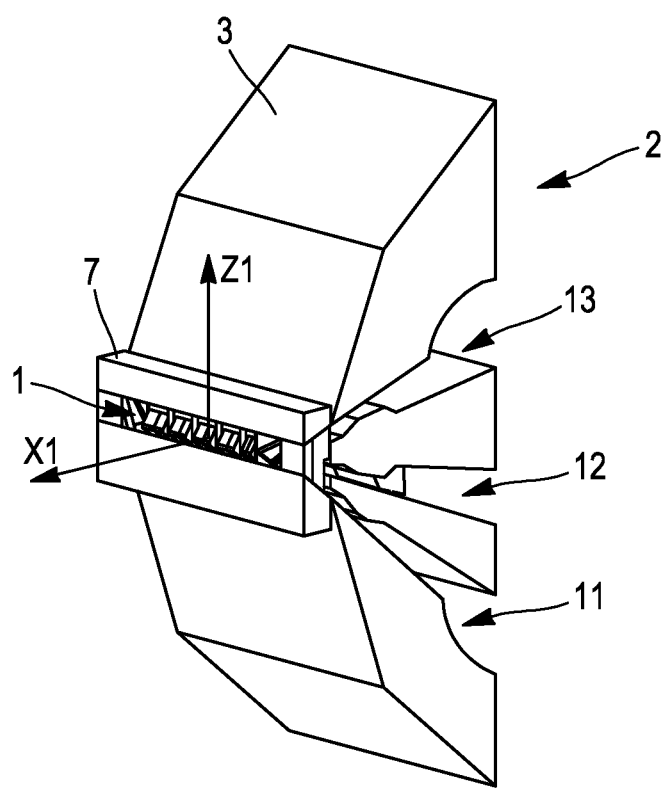
FIG. 2 illustrates, in a view in perspective with material removed, an extrusion installation comprising extrusion tooling according to the invention.

As can be seen in FIGS. 1, 2 and 3, the preformer 1 is preferably accommodated in a box 7, which is advantageously fitted detachably on the output of the head 3.

The said box 7 preferably also bears a die 8, onto which the preformer 1 opens out, and which provides the extruded profiled element 60 with its definitive form, and more particularly provides the straight cross-section of the extruded profiled element 60, i.e. the cross-section of the profiled element which is normal to the direction of flow X1, with its definitive outer contour.

The said die 8 is preferably formed by joining a first, upper blade 8A, and a second, lower blade 8B, in order to facilitate the assembly then the dismantling and cleaning of the die 8.

Advantageously, the box 7 is easily interchangeable, and both the die 8 and the preformer 1 are easily replaceable within the said box 7, which makes it possible to reconfigure and/or clean the extrusion tooling easily, according to the needs of the production line.

As can be seen in FIGS. 1 and 2, the preformer 1 can be subdivided into an upstream preformer 1A, and a downstream preformer 1B. This makes it possible in particular to facilitate the assembly of the preformer 1 and the securing thereof within the box 7, since the downstream preformer 1B can for example be sandwiched between the upstream preformer 1A, which is preferably in a single piece, and a wall of the box 7. For its part the upstream preformer 1A can be secured and clamped on the said box 7 by means of securing screws.

By way of indication, the length L1 of the downstream preformer 1B, considered in the direction of flow X1, will preferably be 30 mm or less, and preferably 25 mm or less.

More specifically, the invention will preferably relate to the downstream preformer 1B, but can also be implemented within the upstream preformer 1A, or, as a variant, on a preformer 1 which does not have an upstream/downstream subdivision.

In order to be able to extrude jointly the aforementioned plurality of elastomer mixes, superimposed in a first direction Z1 transverse to the direction of flow X1, known as the "direction of stacking" Z1, the preformer 1 according to the invention comprises a first channel 11 which is designed to convey a first elastomer mix, a second channel 12 which is designed to convey a second elastomer mix, and is separated from the first channel by a first partition 15, then a third channel 13, which is designed to convey a third elastomer mix, and is separated from the second channel 12 by a second partition 16.

The second channel 12 thus forms an inner duct, which is sandwiched between the first channel 11 and the third channel 13 over at least a part, preferably on most, or preferably over all of the length L1 of the preformer 1, measured from upstream towards downstream of the said preformer 1.

By analogy, it can be considered that the first partition 15 thus forms the floor of the second channel 12, whereas the second partition 16 forms the ceiling of the said second channel 12.

In straight cross-section on a plane normal to the direction of flow X1, this stack of intermediate channels 11, 12, 13 according to the invention advantageously provides three distinct cross-sections of passage, each dedicated to one of the elastomer mixes, thus making it possible to convey the different elastomer mixes in parallel, without them being mixed with one another, for as long as the said elastomer mixes are separated by the first and second partitions 15, 16.

For this purpose, the first and second partitions 15, 16 will preferably be arranged such that the second channel 12 joins one and/or the other of the first and third channels 11, 13 which border it only at the downstream end of the preformer 1, in the location where the elastomer mixes enter the blade of the die 8, or in the immediate vicinity of the said downstream end of the preformer 1. In order to do this, the first and second partitions 15, 16 will preferably each extend over at least 75%, or over at least 90%, or over all, of the overall length L1 of the preformer 1, considered in the direction of flow X1.

Preferably, each elastomer mix comes from a distinct extruder 4, 5, 6.

Preferably, the second elastomer mix has a composition distinct from that of the first elastomer mix. According to a possible implementation, each of the first, second and third elastomer mixes has a composition different from the respective compositions of each of the two other elastomer mixes.

By convention, it can be considered that the direction of flow X1 is representative of the general direction of flow common to the elastomer mixes, corresponding to a fictitious straight line, which in this case is horizontal in FIGS. 1 to 3, whereas the direction of stacking Z1 is preferably perpendicular to the said direction of flow X1, and in this case is vertical in FIGS. 1 to 3.

The direction of flow X1 advantageously corresponds to the longitudinal direction of the extruded profiled element 60, i.e. to the direction in which the tooling generates the length of the profiled element, whereas the direction of stacking Z1 preferably corresponds to the thickness of the said profiled element 60.

Thus, preferably, the preformer 1 can be designed to generate a stratified profiled element 60 which has, stacked according to the thickness of the said profiled element, a first layer 61 forming a sub-layer 61, obtained from the first channel 11 and produced from the first elastomer mix, then a second layer 62 forming an intermediate layer 62, obtained from the second channel 12 and produced from the second elastomer mix, then a third layer 63 forming an over-layer 63, obtained from the third channel 13 and produced from the third elastomer mix, as illustrated in FIG. 16B.

It will be appreciated that the preformer 1 according to the invention comprises at least a first, a second and a third channel 11, 12, 13 stacked on one another, and thus at least a first partition 15 and a second partition 16, on the understanding that the preformer 1 can comprise a number of stacked channels more than three, and as many partitions as necessary to separate in pairs these intermediate channels which are stacked in the direction of stacking Z1.

In addition, the first, second and third channels 11, 12, 13, and consequently the first partition 15 and the second partition 16, extend in width in a second direction Y1 transverse to the direction of flow, known as the "lateral direction" Y1, which is also transverse, and preferably perpendicular to the direction of stacking Z1. The lateral direction Y1 will preferably correspond to the width of the extruded profiled element 60.

By convention and for convenience of description, it will preferably be considered that the said lateral direction Y1 is perpendicular to the direction of flow X1, and, more preferably, that the said lateral direction Y1 forms a direct orthogonal trihedron with the direction of flow X1 and the direction of stacking Z1.

According to the invention, the preformer 1 comprises at least one stiffener 20 which is formed integrally with the first partition 15 and the second partition 16, and extends such as to pass through at least the second channel 12 in the direction of stacking Z1 transverse to the direction of flow X1, such that the said stiffener 20 thus has, at least in the cross-section of passage of the said second channel, a leading edge 21 which allows the elastomer mix following the second channel 12 to pass around the said stiffener 20, splitting into two sub-flows which flow, in the said second channel 12, on both sides of the said leading edge 21, and thus on both sides of the said stiffener 20.

The two sub-flows of the same channel 12 will thus flow respectively along a first flow surface 23 of the stiffener, known as the "bottom surface" 23, and along a second flow surface 24 of the said stiffener, situated on the other side of the leading edge 21, and known as the "top surface" 24.

Preferably, the bottom surface 23 will form a curved surface, for better fluidity of the flow.

Similarly, the top surface 24 will preferably form a curved surface.

Having said that, strictly speaking it could be envisaged to produce a bottom surface 23, and/or respectively a top surface 24 in the form of a flat surface, or a prismatic assembly of a plurality of flat surfaces which would form facets, and would be joined to one another by sharp or rounded ridges.

Advantageously, irrespective of the forms of the bottom surface 23 and the top surface 24, the stiffener 20 forms a strut which is integral with the first and second partitions 15, 16, and which makes it possible to brace the said partitions particularly strongly and stably, since the said stiffener 20 thus prevents very efficiently both moving towards and away from one another by the said first and second partitions 15, 16, without disrupting significantly the flow within the second channel 12, since the said stiffener 20 allows the second elastomer mix to be subdivided laterally into two streams within the said second channel, i.e. a first stream which follows the portion of the second channel 12 situated laterally, in the lateral direction Y1, on a first side of the stiffener 20, and which is therefore delimited laterally by the bottom surface 23, and a second stream which follows the portion of the second channel 12 situated laterally on the other side of the stiffener, opposite the first stream relative to the stiffener 20, which second stream is thus delimited by the top surface 24.

It will be noted that the stiffener 20 extends, in the direction of flow X1, between the aforementioned leading edge 21 and a trailing edge 22, such that the bottom surface 23 and the top surface 24 each join the said leading edge 20 to the said trailing edge 22.

Preferably, the trailing edge 22 is situated upstream from the downstream end of the preformer 1, such that the stiffener 20 is interrupted before the downstream end of the preformer 1, and thus allows the two sub-flows of the elastomer mix concerned, in this case in particular the two sub-flows of the second elastomer mix, to rejoin in order to reconstitute a single flow within the channel concerned, before exiting from the preformer 1 and penetrating into the die 8.

This makes it possible in particular not to disrupt the flow of the elastomer mix concerned at the approach to the blades 8A, 8B of the die 8.

Thanks to the stiffener 20 which prevents any undesirable deformation, it is advantageously possible to produce particularly fine partitions 15, 16, without risk of having them bend under the pressure, in particular when there is a considerable difference in pressure between the second channel 12, and one or the other of the first and third channels 11, 13.

Figure 6:
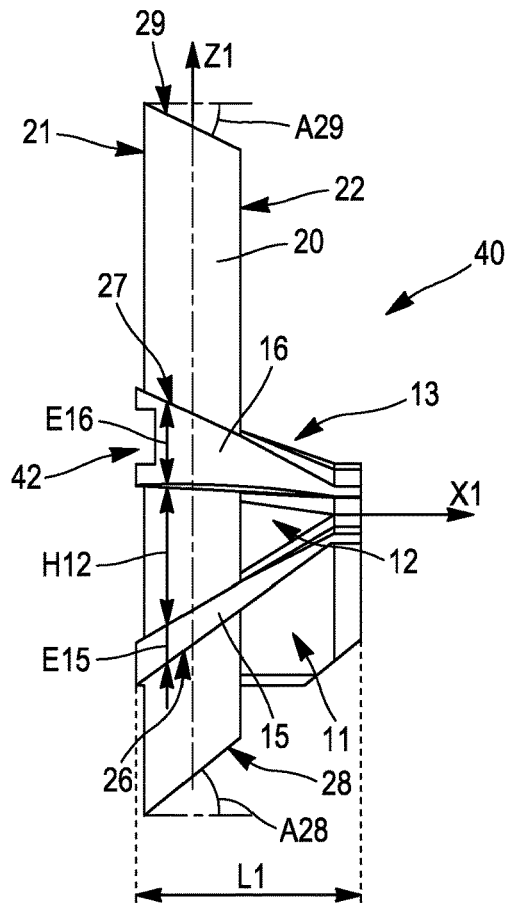
FIG. 6 is a view in lateral projection of the module in FIGS. 4 and 5.
Figure 7:
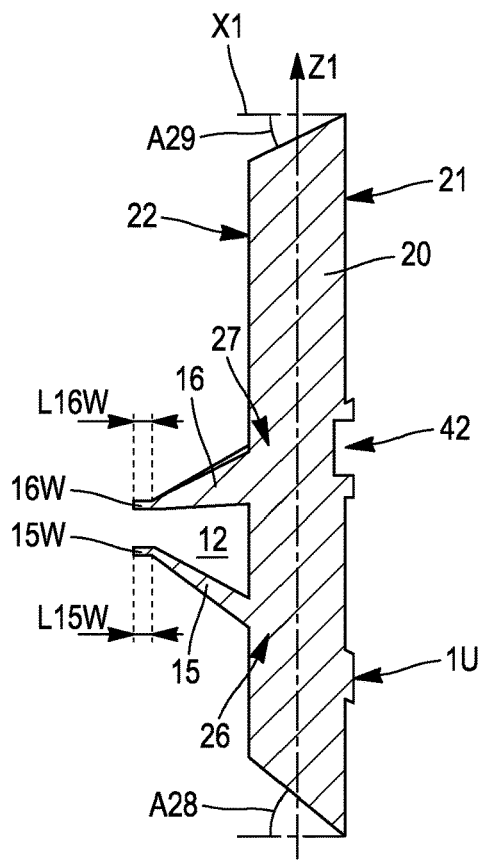
FIG. 7 is a lateral view in cross-section of the module in FIGS. 4 and 5, on a cross-sectional plane parallel to the direction of stacking, and passing through the stiffener.
Figure 8:
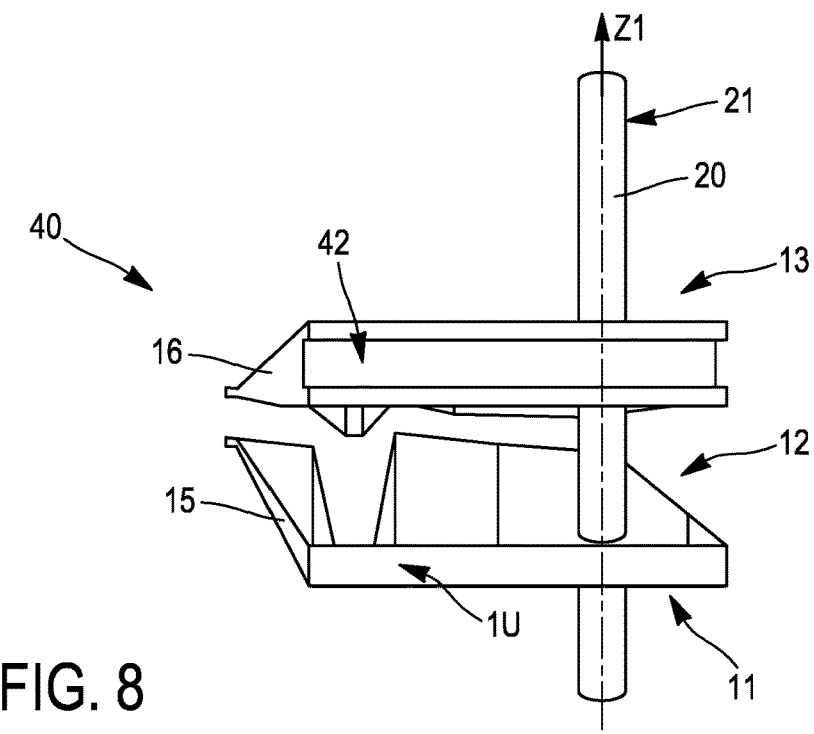
FIG. 8 is a view from the back of the module in FIGS. 4 and 5, showing an alignment groove.

In this respect, it will be noted that, preferably, the first partition 15 has a thickness E15, measured in the direction of stacking Z1, as shown in FIG. 6, which is between 3 mm and 30 mm, preferably between 4 mm and 20 mm, or between 4 mm and 15 mm, and/or respectively that the second partition 16 has a thickness E16, measured in the direction of stacking Z1, which is between 3 mm and 30 mm, and preferably between 8 mm and 20 mm.

More particularly, on the portion of the said first partition 15 which is situated downstream from the leading edge 21, i.e. which extends in the direction of flow X1 between the said leading edge 21 upstream and the downstream end of the said first partition 15, the first partition 15 preferably has a thickness E15, measured in the direction of stacking Z1, the maximal value of which is 30 mm or less, or 20 mm or less, or even 15 mm or less.

Similarly, on the portion of the said second partition 16 which is situated downstream from the leading edge 21, i.e. which extends in the direction of flow X1 between the said leading edge 21 upstream and the downstream end of the said second partition 16, the second partition 16 preferably has a thickness E16, measured in the direction of stacking Z1, the maximal value of which is 30 mm or less, or preferably 20 mm or less.

Thus, the preformer 1 can have a structure which is particularly fine, compact and light, but nevertheless very strong.

In addition, and if applicable in combination with one and/or the other of the dimensions of thickness of the first partition E15 and the second partition E16 specified above, the second channel 12 preferably has a height of passage H12, measured in the direction of stacking Z1 between the first partition 15 and the second partition 16, between the leading edge 21 and the trailing edge 22 of the stiffener 20, which is between 1 mm and 50 mm.

More particularly, the height of passage H12, i.e. the height of the cross-section of passage of the second channel 12 measured between the first partition 15 and the second partition 16 in the direction of stacking Z1, will preferably be, on the portion of the second channel 12 which is situated downstream from the leading edge 21, i.e. between the leading edge 21 upstream and the downstream end of the second channel 12, 50 mm or less, or 30 mm or less, or even 20 mm or less.

Thus, in this case also, the preformer 1 can have a structure which is particularly fine, compact and light, but nevertheless very strong.

This fineness makes it possible in particular to supply and position a fine layer of a second elastomer mix, conveyed by the second channel 12, between two layers of elastomer mixes which are more viscous and/or thicker, obtained from the first and third channels 11, 13, while controlling precisely the respective thicknesses of the said layers within the profiled element 60 finally obtained.

In addition, the small size of the stiffener 20, in relation to the cross-section of passage of the channel 11, 12, 13 in which the said stiffener is contained, makes it possible to avoid excessive losses of energy when the corresponding elastomer mix is forced to progress through the said channel 11, 12, 13.

It will be appreciated that the height of passage H12 of the second channel 12 will depend on the thickness of the layer 62 of profiled element to be obtained at the output from the second channel 12, as well as on the nature of the second elastomer mix allocated to the second channel 12.

It will also be noted that, preferably, the preformer 1 has a globally convergent structure, since the height H12 of the cross-section of passage of the second channel 12, and more globally the respective heights of passage of each of the first, second and third channels 11, 12, 13, considered in the direction of stacking Z1, narrow, preferably in a monotonic manner, going along the preformer 1 from upstream to downstream, in the direction of flow X1.

The same preferably applies to the respective thicknesses E15, E16 of the first and second partitions 15, 16, which grow thinner in the direction of flow.

Preferably, the material which constitutes the first partition 15, the second partition 16 and at least one stiffener 20 formed integrally with the said first and second partitions 15, 16, is steel. Advantageously, steel makes it possible to produce finer and stronger structures of channels 11, 12, 13 and partitions 15, 16 than the aluminium alloys which are usually used to produce the preformers.

By way of indication, it is possible to use a stainless steel, alloyed with chrome, nickel and/or molybdenum, such as an INCONEL® or MARAGING steel.

It will be appreciated that the production in a single piece advantageously makes it possible to render the first and second partitions 15, 16 integral with the stiffener 20, and thus to render the said partitions 15, 16 integral with one another by means of the said stiffener 20, without needing to use any separate added-on securing means of the type such as screws or welding.

Preferably, as well as passing through the second channel 12, the stiffener 20 in a single piece also passes through at least one of the first 11 and third 13 channels, and preferably each of the first 11 and third 13 channels, such as to have, on the cross-section of passage of each of the channels 11, 12, 13 concerned, a leading edge which allows the elastomer mix following the channel 11, 12, 13 concerned to pass around the said stiffener 20, splitting into two sub-flows which flow, in the said channel concerned, on both sides of the said leading edge 21, and thus on both sides of the said stiffener 20, in this case preferably respectively along a first curved surface of the stiffener known as the "bottom surface" 23 and along a second curved surface of the said stiffener known as the "top surface" 24, as explained above.

Thus, ultimately, the preformer 1 can comprise at least one stiffener 20 which is formed integrally with the first partition 15 and the second partition 16, and extends such as to pass through the first channel 11, the second channel 12 and the third channel 13 in the direction of stacking Z1 transverse to the direction of flow X1, thus having, in the cross-section of passage of each of the said first, second and third channels 11, 12, 13, a leading edge 21 which allows the elastomer mix following the channel concerned to pass around the said stiffener, splitting into two sub-flows which flow, in the said channel concerned, on both sides of the said leading edge, and thus on both sides of the said stiffener, respectively along the bottom surface 23 and the top surface 24.

Figure 10:
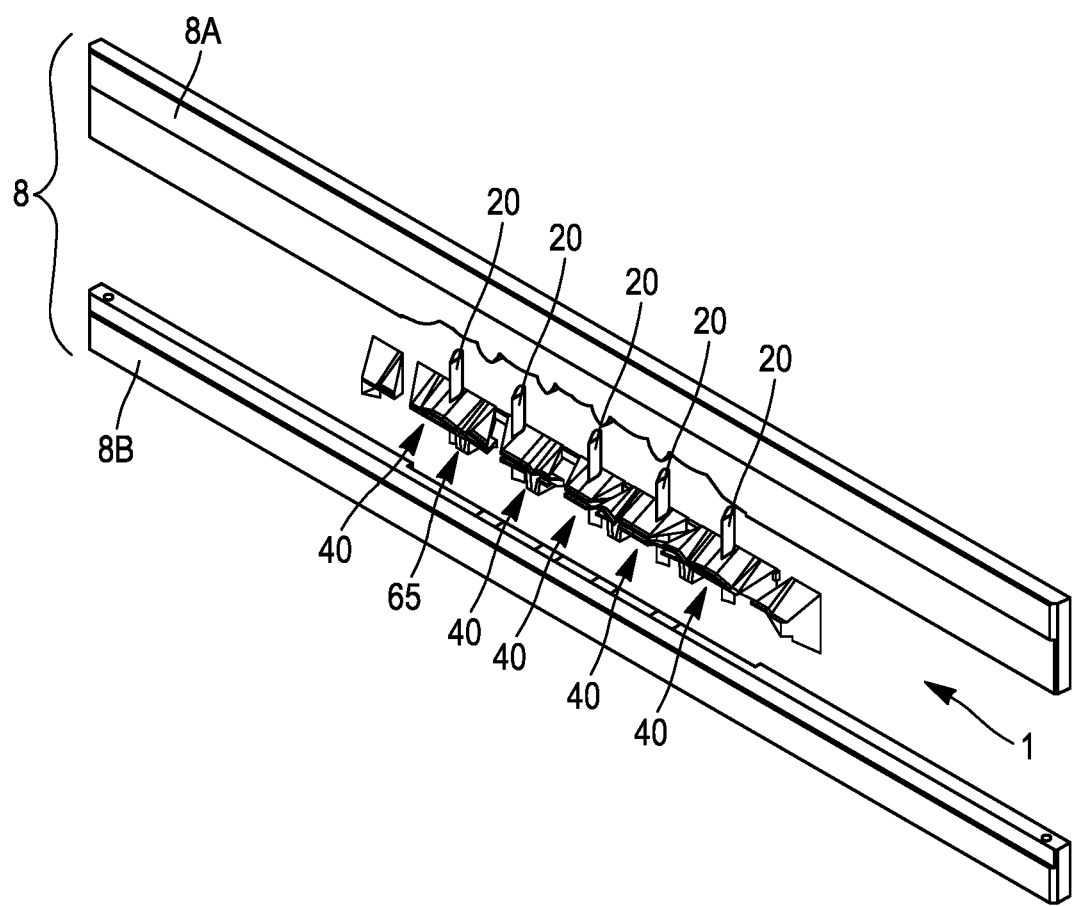
FIG. 10 illustrates, in a view in perspective, the assembly principle of a plurality of modules combined in order to form a preformer, the width of which corresponds to that of the profiled element concerned.

More globally, the stiffener 20 can advantageously pass through in a single piece a plurality of channels and a plurality of series of partitions 15, 16 delimiting the said channels, and more particularly the series of channels 11, 12, 13 which are present along the entire height of the preformer 1, considered in the direction of stacking Z1, as illustrated in FIGS. 1, 3 and 10.

Figure 9:
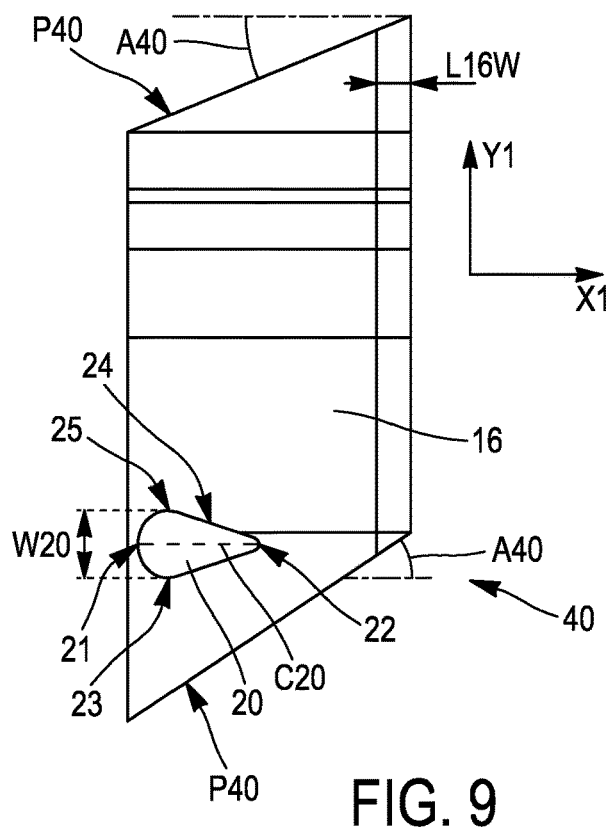
FIG. 9 is a view from above, on a plane normal to the direction of stacking, of the module in FIGS. 4 and 5.
Figure 11:
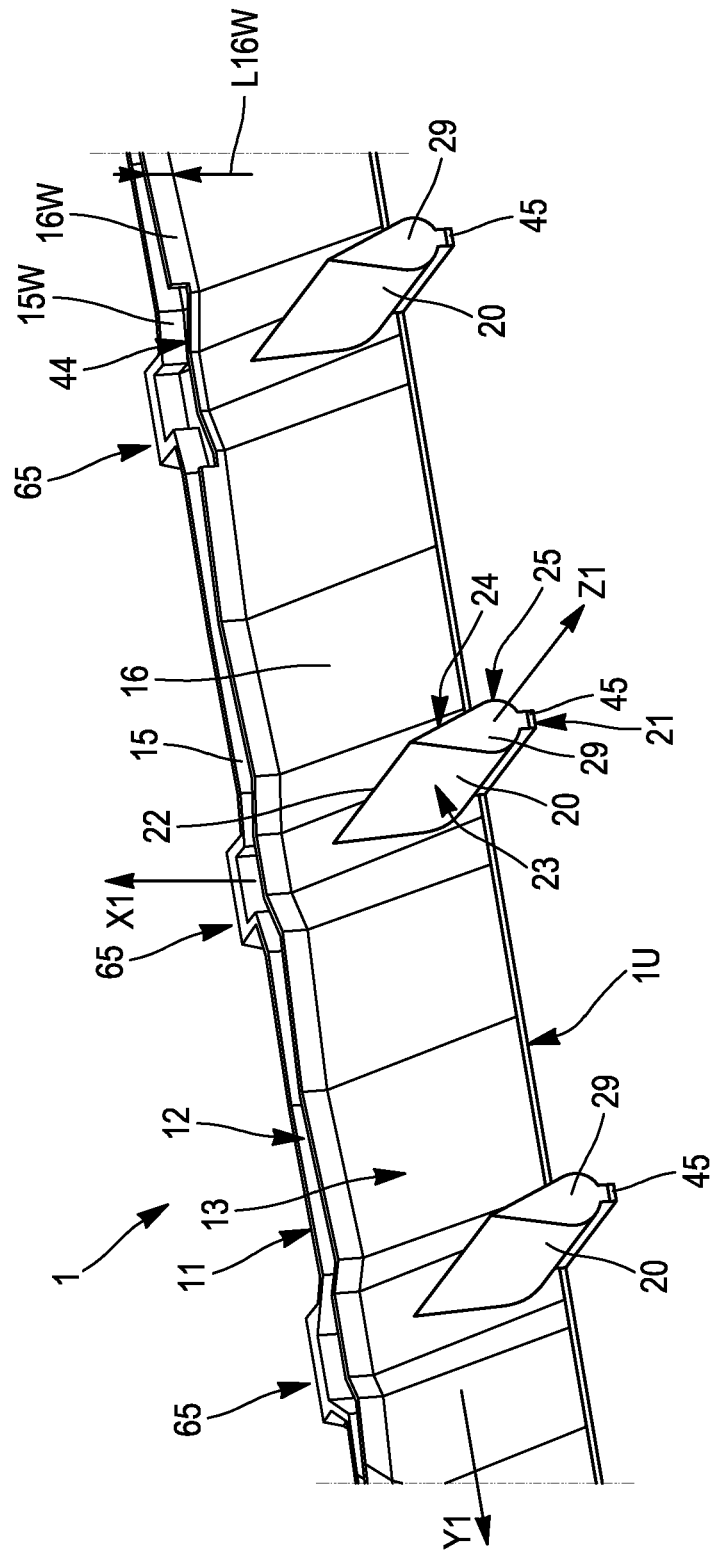
FIG. 11 illustrates, in a partial view in perspective, a preformer according to the invention obtained by additive manufacturing.

Preferably, the stiffener 20 extends in the direction of flow X1 between the leading edge 21 and a trailing edge 22, such as to have, as previously stated, on both sides of the said leading edge, respectively a first flow surface 23, which is preferably curved, known as the "bottom surface" 23, and a second flow surface 24, which is preferably curved, known as the "top surface" 24, which flow surfaces 23, 24 each join the leading edge 21 to the trailing edge 22, and the stiffener 20 has a cross-section, delimited by the bottom surface 23 and the top surface 24, which forms, relative to the chord C20 which connects the leading edge 21 to the trailing edge 22 in a straight line, a biconvex profile, and preferably a symmetrical biconvex profile, as shown clearly in FIGS. 9 and 11.

This, in cross-section normal to the direction of stacking Z1, the stiffener 20 has, at least in the cross-section of passage of the second channel 12, and preferably in the cross-sections of passage of at least two, or all of the first, second and third channels 11, 12, 13, a hydrodynamic profile which induces little disturbance in the flows of the elastomer mixes, and thus limits the losses of load when the elastomer mixes pass around the stiffener 20, in their respective channel.

Preferably, the stiffener 20 is oriented, in yaw about the direction of stacking Z1, in such a manner that the angle of incidence of the flow of the elastomer mix, which corresponds to the angle formed between the direction of flow X1 and the chord C20, in projection on a plane normal to the direction of stacking Z1, is substantially zero (typically less than 5°, or less than 2°), or exactly zero, i.e. the chord C20 is aligned with the direction of flow X1.

Preferably, as shown clearly in FIG. 4, 9, 10 or 11, the cross-section of the stiffener 20 has an upstream bulge 25, such that the profile formed by the said cross-section, in this case more particularly the biconvex profile, is thicker in the upstream half of the chord C20, on the leading edge 21 side, than in the downstream half of the said chord C20, on the trailing edge 22 side.

Thus, the cross-section of the stiffener 20 has its maximal thickness W20, measured in the lateral direction Y1, closer to the leading edge 21 than to the trailing edge 22.

More particularly, the thickness of the stiffener 20 preferably increases continuously from the leading edge 21 to a top which forms the culminating point of the bottom surface 23 and respectively of the top surface 24, relative to the chord C20 (i.e. the point of the bottom surface and respectively of the top surface which is furthest from the chord in the lateral direction Y1), which top is closer to the leading edge 21 than to the trailing edge 22, then the said thickness of the stiffener 20 subsequently decreases in a monotonic manner as far as the trailing edge 22.

Advantageously the bulge 25 of the stiffener 20 provides a relatively wide seat for the stiffener on the partitions 15, 16, which assists efficient and stable anchorage of the said partitions 15, 16, while allowing the stiffener 20 to have progressive, gentle and relatively localised variation of thickness. This progressive variation of thickness in the direction of flow makes it possible to assist the flow while maximising globally the useful cross-section of passage of the channels 11, 12, 13 in which the stiffener 20 is implanted, in particular the useful cross-section of passage of the downstream portions of the said channels 11, 12, 13, since the stiffener is in fact thinned in the said downstream portions of the channels.

By way of indication, the maximal thickness W20 of the stiffener 20, and thus the width which the said stiffener 20 occupies in the second channel 12, is between 2 mm and 8 mm, preferably between 3 mm and 6 mm, and for example 6 mm. Once again, this fineness limits the impact of the presence of the stiffener 20 on the flow in the channel concerned.

According to a particularly preferential arrangement, the stiffener 20 extends in a single piece beyond the second channel 12, through at least one of the first and third channels 11, 13, and the different component portions of the said stiffener 20, which appear in the channels concerned and form a leading edge 21 in the cross-section of passage of the said channels concerned, have a cylindrical form which is generated by a constant base cross-section, which, through the different channels concerned, sweeps a single straight generatrix parallel to the direction of stacking Z1.

According to a preferential arrangement of this type, the stiffener 20 will thus have a cross-section (between the bottom surface 23 and the top surface 24) which is identical, with a form and dimensions which are constant through the different channels 11, 12, 13, over the entire height of the said stiffener 20, considered in the direction of stacking Z1. In particular, this will simplify the manufacture of the said stiffener 20, and more globally the preformer 1.

According to a possible implementation, the stiffener 20 will thus be able to extend with a constant cross-section through all of the three channels 11, 12, 13 as illustrated in FIGS. 1, 3, 4 and 5.

Figures 12, 13:
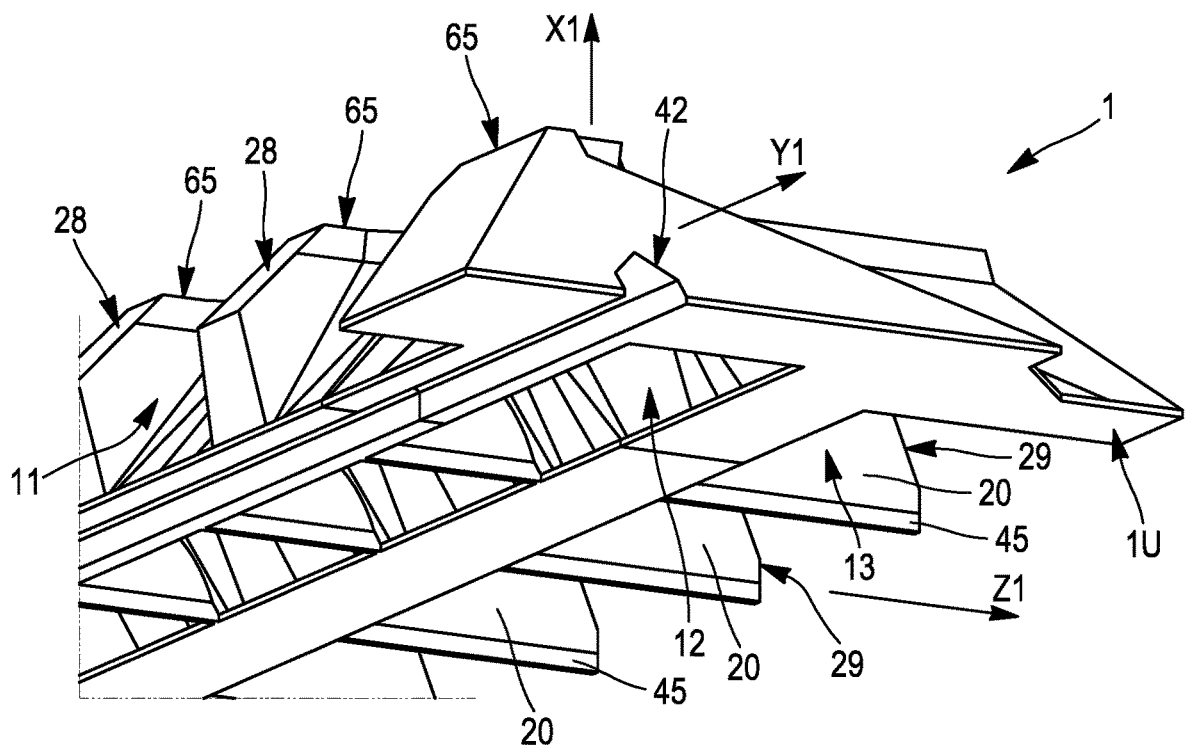
FIG. 12 illustrates, in another partial view in perspective, the pre-form in FIG. 11.
FIG. 13 illustrates, in a schematic view, the principle of the roughness induced on the inclined surfaces of a preformer according to the invention by the production in steps specific to the additive manufacturing.

According to another possible implementation, as shown in FIG. 12, the stiffener 20 will be able to pass in a single piece, which is preferably straight, through the three channels 11, 12, 13, but have in one of the channels (in this case the first channel 11 in FIG. 12) cross-section which is different from that of the cross-section(s) which the said stiffener 20 has in the two other channels. In this case, in the example in FIG. 12, the stiffener has a symmetrical biconvex cross-section which is identical in the second channel 12 and the third channel 13, and a different, polygonal cross-section in the first channel 11.

In this respect, it will be noted that, as can be seen clearly in FIGS. 11, 12, 15 and 16A, the position of the stiffener 20 in the lateral direction Y1 can advantageously coincide with an area in which one of the end channels is closed, in this case the first channel 11, such as to interrupt the corresponding layer, in this case the sub-layer 61, in the profiled element 60, and the other channels 12, 13, and thus the other layers 62, 63 of the profiled element 60 are turned down, so as to create a depression, such as a longitudinal furrow 64, in the said profiled element 60, as can be seen in FIG. 16B.

A longitudinal furrow 64 of this type advantageously prefigures the definitive circumferential furrow which will be found after curing of the outer casing, amongst the grooves of the tread of the said outer casing.

More globally, according to a preferential characteristic, the first partition 15 and the second partition 16 preferably have at least one set-back 65 on the width of the preformer 1 considered in the lateral direction Y1, at which set-back 65 the second channel 12 and the third channel 13 are both turned down towards the first channel 11 in the direction of stacking Z1, or compress and interrupt the said first channel 11 locally, such as to be able to form a longitudinal furrow 64 in an extruded profiled element 60 which is designed to form a tread for an outer casing, and the stiffener 20 extends in the second channel 12 and the third channel 13, vertically aligned with the said set-back 65.

Advantageously, it is thus possible to position the stiffener 20 in an area where the distribution, and in particular the thicknesses of the elastomer mixes, need to be controlled precisely, which requires precise and stable positioning of the partitions 15, 16. Since the flow of the elastomer mixes is already necessarily somewhat disturbed by the set-back 65, the addition of the stiffener 20 in this area does not have any aggravating effect in terms of quality and fluidity of flow. Finally, this makes it possible to produce the stiffener 20 in the extension of, and integrally with, an excess thickness of the first partition 15 which interrupts the first channel 11 locally, and at the same time provides a plane with a free end 28 which gives stable support against the box 7.

Figure 5:
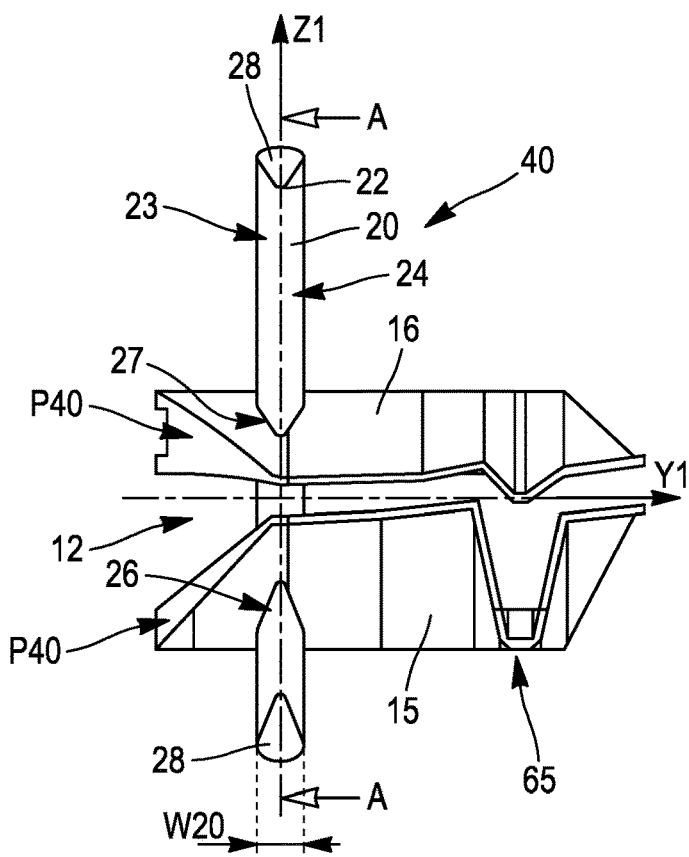
FIG. 5 is a view from the front of the module in FIG. 4.

According to another possible arrangement, the stiffeners 20 can be offset relative to the set-backs 65 in the lateral direction Y1, such that the set-backs 65 and stiffeners 20 are phase-shifted spatially on the width of the preformer 1, as can be seen in FIGS. 5 and 10.

Preferably, and moreover irrespective of the arrangement of its cross-section(s), the stiffener 20 extends in the manner of a cantilevered beam into the first channel 11 and/or respectively into the third channel 13, and more globally into one and/or the other of the so-called "end channels" 11, 13 which form the ends of the preformer 1 in the direction of stacking Z1.

In other words, in these end channels, in this case in the first channel 11 and/or the third channel 13, the portion of the stiffener 20 which projects in height through the end channel 11, 13 concerned extends, in the channel concerned, from a first end, forming an anchorage foot 26, 27 which is integral with the partition 15, 16 concerned, and thus attaches the said stiffener 20 to the preformer 1, as far as a second free end 28, 29.

The said free end 28, 29 is not supported on, or attached to, the preformer 1 by any cross-member distinct and distant from the partition 15, 16, and which would delimit the cross-section of passage of the end channel 11, 13 concerned. The said free end 28, 29 is advantageously designed to be supported, in the manner of a crutch, against a distinct support part of the preformer, in this case for example against the box 7.

Thus, the cross-section of passage of the end channel 11, 13 is initially open, in that it is delimited by a contour which is not closed on itself, until the preformer 1 is inserted in the box 7, such that the free end(s) 28, 29 of the stiffener is/are supported against a support face 30, 31 which belongs to another part, preferably a support face 30, 31 which belongs to the said box 7, and which thus forms a cross-member which closes on itself the contour of the cross-section of passage of the channel 11, 13 concerned.

Once the preformer 1 is in place in the box 7, the end channels 11, 13 are thus delimited, in the direction of stacking Z1, firstly by the support face 30, 31 of the box 7, and secondly by the partition 15, 16 of the preformer which is closest in the direction of stacking Z1.

Advantageously, the stiffener 20 allows the preformer 1 to be supported firmly and stably against the very rigid wall of the box 7, which support braces and reinforces the first and second partitions 15, 16. This support of the free ends 28, 29 of the stiffener 20 against the box 7 also advantageously makes it possible to prevent tilting of the preformer 1 with pitching around the lateral direction Y1.

Preferably, at least one free end 28, 29 of the stiffener 20, and preferably each of the two free ends 28, 29 of the stiffener 20, forms an inclined plane, which is designed to cooperate with a conjugated bevelled support face of the box 7, such as to ensure self-locking of the preformer 1 in the box 7 by wedging effect, against the thrust exerted by the flows in the direction of flow X1.

Thus, according to a preferential arrangement illustrated in FIGS. 1, 3, 6 and 12, the stiffener 20 extends in the direction of stacking Z1 from a first end plane 28 to a second end plane 29, and the said first and second end planes 28, 29 are inclined relative to the direction of flow X1 according to an orientation which makes the said end planes 28, 29 converge towards one another in the downstream direction of the flow, such that the said first and second end planes 28, 29 can cooperate respectively with a first bevelled support face 30 and a second bevelled support face 31 of a box 7 receiving the preformer 1, in order to ensure automatic centring of the preformer 1 within the said box 7, as well as retention of the said preformer 1 within the box 7 in the direction of flow.

A28 and A29 indicate the respective angles of inclination of the first end plane 28 and the second end plane 29. These angles of inclination A28, A29 can be equal or on the other hand different, and will preferably be between 5° and 60°, and for example between 20° and 45°.

Preferably, as can be seen in FIGS. 1, 10, 11 and 12, the preformer 1 comprises a plurality of stiffeners 20 which are distributed such as to be spaced from one another in the lateral direction Y1, each of the said stiffeners 20 being formed integrally with the first partition 15 and the second partition 16, and extending in the direction of stacking Z1, preferably parallel to the said direction of stacking Z1, in order to pass through at least the second channel 12, and preferably also at least one, or each, of the first and third channels 11, 13.

Advantageously, the multiple numbers of stiffeners 20, and thus of support points, on the width of the preformer 1, make it possible to avoid leaving an excessively long partition 15, 16 bearing surface without support, and thus to ensure homogeneous retention of the partitions 15, 16 in the lateral direction Y1, such that any significant bending of the said partitions 15, 16 is avoided. However, the relative fineness of the stiffeners 20 makes it possible not to impede the flows, and to maintain a light and compact structure.

Each of the stiffeners 20 of the plurality of stiffeners distributed on the width of the preformer 1 can have some or all of the characteristics described above. In addition, preferably, a plurality of the said stiffeners 20, and preferably all the stiffeners 20 which are present on the width of the preformer 1 will have the same form, and more globally the same characteristics of forms and dimensions. In other words, for convenience of manufacture, it will be possible to use a single stiffener 20 model, which is advantageously duplicated identically in a plurality of locations on the width of the preformer 1.

According to another possible implementation, the width of the preformer 1 can be split along the lateral direction Y1 into a plurality of individual modules 40 (or "elementary modules") which each comprise a portion of the width of the first partition 15 and a portion of the width of the second partition 16, and consequently a portion of the width of the first channel 11, the second channel 12, and the third channel 13, as illustrated in FIGS. 1 and 10.

The said individual modules 40 advantageously abut in pairs, reversibly, edge to edge, in the lateral direction Y1.

Thus, each individual module 40 corresponds to a section of width of the preformer 1, and at least two of these individual modules 40, which are designed to abut side by side in the lateral direction Y1, each comprise a portion of the "sandwich" formed by the first, second and third superimposed channels 11, 12, 13. Thus, once the said individual modules 40 are coupled to one another, the portion of first channel 11 of the first of the said at least two modules communicates with, and extends laterally, the portion of first channel 11 of the second adjacent module, and more preferably of the adjacent modules. The same advantageously applies for the second and third channels 12, 13.

Bringing the individual modules 40 abreast thus reconstitutes the complete preformer 1.

By way of indication, in order to form its complete width, the preformer 1 will preferably comprise at least two individual modules 40, for example three to seven individual modules 40.

It will be appreciated that the number of individual modules 40 can be adapted according to the width of the preformer. Thus, typically, it will be possible to provide three to seven individual modules for a preformer 1, the width of which is between 400 mm and 500 mm, which is typically the case when the preformer is designed for the manufacture of profiled elements 60 used to form the tread of outer casings destined for heavy vehicles. It will also be possible to provide a larger number of individual modules for a preformer with a width of 800 mm, as is the case for preformers which are designed to extrude profiled elements 60 used to form the tread of outer casings destined for agricultural vehicles.

Advantageously, a modular arrangement of this type of the preformer 1 makes it possible to touch up or replace an individual module 40 separately if necessary, without this touching up or replacement having an effect on the other individual modules 40.

This simplifies greatly the development of the tooling, since the development process does not require production of a complete new preformer for each retouching operation, or consequently scrapping of an entire preformer each time the development process is repeated.

Preferably, at least one of the individual modules 40 comprises at least one stiffener 20 formed integrally with the portion of the first partition 15 and the portion of the second partition 16 of the said module 40.

Preferably, a plurality of individual modules 40, and in particular at least two adjacent individual modules 40, each comprise at least one stiffener 20 formed integrally with the portion of the first partition 15 and the portion of the second partition 16 of the module 40 concerned.

According to a preferential characteristic, which incidentally can form the basis of a separate invention, whether the individual modules 40 which constitute the preformer 1 comprise stiffeners 20 according to the invention or not, the individual modules 40 abut according to joining planes P40 placed obliquely, such that, in projection on the plane formed by the direction of flow X1 and the lateral direction Y1, the said joining planes P40 each form a non-zero angle A40 relative to the direction of flow X1 which is known as the "yaw angle" A40, as can be seen in FIG. 9, so that the individual modules 40 block one another in the direction of the flow, as shown in FIGS. 1 and 10.

It will be noted that, in the reference system (X1, Y1, Z1), the angle of inclination A40 of the joining planes P40 of the individual modules 40 in this case corresponds to an angle of deflection in yaw, whereas the angles of inclination A28, A29 of the first and second end planes 28, 29 correspond to angles of inclination in pitch.

In addition, the tooling will preferably comprise flanges 41, which are placed laterally on both sides of the preformer 1, and more particularly on both sides of the series of individual modules 40 which are aligned abreast in order to form the width of the said preformer 1.

The said flanges 41 make it possible to retain the preformer 1 laterally within the box 7, and more particularly to block the individual modules 40 transversely by exerting lateral compression which presses the said individual modules 40 against one another with mutual drawing together, in the lateral direction Y1.

Preferably, the flanges 41 are engaged on the lateral ends of the preformer 1, and more particularly on the individual modules 40 forming the lateral ends of the preformer 1, according to oblique joining planes, which are inclined in yaw relative to the direction of flow X1, in order to obtain a self-locking effect similar to that already mentioned above.

The preformer 1 is thus firmly retained in and by the closed frame formed by the box 7 which surrounds the preformer 1, both in the direction of stacking Z1 and in the transverse direction Y1.

According to another possible implementation, the preformer 1 (in this case more particularly the downstream preformer 1B), whether the said preformer incidentally comprises one or a plurality of stiffeners 20 distributed on its width, can, instead of being formed by the joining of a plurality of individual modules 40, be formed entirely in a single piece, as illustrated in FIGS. 11 and 12.

According to a variant of this type, there will be formation in a single piece of a first partition 15 covering the entire width of the preformer 1, a second partition 16 covering the entire width of the preformer 1, and the series of associated stiffeners 20, distributed on the said total width.

A monolithic arrangement of this type of the preformer 1 as a whole is particularly suitable for the manufacture of production tooling which is designed for mass production of profiled elements 60, with the said tooling thus having its definitive form, as derived from prior development.

In fact, tooling of this type can easily be duplicated in order to be replaced identically once it is worn. In addition, a monolithic preformer 1 is advantageously not subject to phenomena of wear of the joining planes P40, or to the occurrence of play or the appearance of offsetting between individual modules 40, thus increasing the reliability and the service life of the tooling in production.

In addition, the preformer 1 can comprise an alignment groove 42, which is designed to receive a key 43.

Preferably, the said key 43 can act as a connection interface between a monolithic preformer 1A upstream, and a modular preformer 1B downstream, as illustrated in FIG. 3.

The presence of an alignment groove 42 of this type advantageously makes it possible to facilitate the fitting of the preformer 1 within the box 7.

The key 43 is preferably in the form of a rectangular parallelepiped, the length of which extends in the lateral direction Y1.

By way of indication, in order to ensure sufficient rigidity, the key 43 will preferably have a height, considered in the direction of stacking Z1, which is 4 mm or more. The recess of the alignment groove 42 will itself thus also have a height of at least 4 mm, slightly greater in practice than the height of the key 43, since it is increased by a value equal to the guiding play necessary.

According to a possible arrangement, the alignment groove 42 is hollowed in the upstream edge of one of the first and second partitions 15, 16.

The thickness E15, E16 of the said partition 15, 16 will then be adapted accordingly, and will for example be at least 8 mm if the key 43 has a height of 4 mm.

It will be appreciated that the preformer 1, and in particular the downstream preformer 1B can comprise an alignment groove 42, and then cooperate with a key 43 both when the said preformer 1, 1B is produced integrally, and when the said preformer 1, 1B is obtained by the assembly of distinct individual modules 40.

Thus, more preferably, the individual modules 40 can each have an alignment groove 42 which extends from one edge to the other of the individual module 40 concerned in the lateral direction Y1, such that the said individual modules 40 can be aligned on a single common key 43 engaged in the series of the said alignment grooves 42.

The key 43 preferably extends integrally on the entire width of the preformer 1, in order to allow the grooves of the intermediate individual modules 40 to be aligned in pairs in the extension of one another, in the direction determined by the said key 43, which direction in this case corresponds to the lateral direction Y1.

Advantageously, a system of this type with a groove 42 and key 43 permits simple and rigid assembly of the modular preformer 1.

In addition, an arrangement of this type with a groove 42 and key 43 permits replacement within the tooling of a provisional modular preformer (designed for development) by a definitive monolithic preformer (designed for production) or conversely, since these two types of preformers 1 definitively use identical means for alignment and securing.

As a variant, and in particular in the case of a monolithic preformer 1, and more particularly in the case of a monolithic downstream preformer 1B, instead of hollowing a groove 42 in the thickness of one of the partitions, 15, 16, according to a "female" (mortise) arrangement and adding a distinct key 43 into the said groove 42, it will be possible to have the key 43 formed integrally with the said partition 15, 16, according to a "male" arrangement forming a tenon. Advantageously, the key 43 thus integrated in the structure of the partition 15, 16 will make it possible to reinforce the said partition 15, 16 instead of making it fragile locally, and will thus permit the production of particularly fine thicknesses of partition E15, E16, in particular at the upstream end of the downstream preformer 1B, and/or more globally upstream from the leading edge 21 of the stiffener 20, or vertically aligned with the leading edge 21 of the stiffener 20. The key 43 forming a tenon will advantageously be able to cooperate with an alignment groove hollowed in the upstream portion of the tooling, more particularly in the downstream end of the upstream preformer 1A.

According to the above "male" variant, if the preformer 1, and more particularly the downstream preformer 1B, comprises a plurality of individual modules 40, as has been described above, then each individual module 40 will be able to comprise a portion of the tenon which the key 43 forms integrally with the corresponding portion of partition 15, 16 of the said individual module 40, such that the said individual modules 40 will be able to be fitted and aligned in a common alignment groove, hollowed in the upstream portion of the tooling, more particularly in the downstream end of the upstream preformer 1A.

Definitively, regardless of whether the variant concerned is male or female, the preformer 1 will thus preferably have a system for alignment of the individual modules 40 by fitting onto a shared alignment element (groove or key).

According to a possible arrangement, the first partition 15 and the second partition 16 have, at the output from the channels 11, 12, 13, extensions 15W, 16W known as "walls" 15W, 16W which are parallel with one another and parallel to the direction of flow X1.

Walls 15W, 16W of this type make it possible to control precisely the formation of the interfaces of joining between the different elastomer mixes.

The walls 15W, 16W preferably have a fine thickness, considered in the direction of stacking Z1, which thickness is preferably between 0.8 mm and 2 mm, and is more preferably 1 mm. This thickness will preferably be constant along the length L15W, L16W of the wall 15W, 16W concerned in the direction of flow X1.

By way of indication, the length L15W, L16W of the said walls 15W, 16W in the direction of flow X1 will preferably be between 1 mm and 6 mm, for example 3 mm.

It will be noted that the said walls 15W, 16W can be interrupted slightly upstream from the threshold of input into the die 8, i.e. slightly upstream from the position of the blades 8A, 8B in the direction of flow X1.

As a variant, the walls 15W, 16W could extend as far as downstream from the threshold of input into the die 8, such as to penetrate between the blades 8A, 8B.

However, according to another preferential variant, the walls 15W, 16W end vertically aligned with the threshold of input into the die 8, i.e. in the position where the blades 8A, 8B start.

Preferably, as shown in FIG. 11, the said walls 15W, 16W have an indentation 44, such that the said walls 15W, 16W are interrupted at different lengths L15W, L16W in the direction of flow, according to the position which the said walls 15W, 16W occupy on the width of the preformer.

Thus, it is possible to regulate finely the performance of the extrudate which is designed to form the profiled element 60, and in particular to control finely the conditions of joining between the second elastomer mix obtained from the second channel 12 on the one hand, and one and/or the other of the first and third elastomer mixes obtained respectively from the first channel 11 and the third channel 13, at the moment when the said elastomer mixes reach and engage between the blades 8A, 8B of the die 8.

Preferably, the assembly in a single piece formed by the first partition 15, the second partition 16 and the at least one stiffener 20 is obtained by additive manufacturing, preferably from a steel powder.

"Additive manufacturing" means a method of manufacturing by addition of material.

The additive manufacturing preferably consists of printing the preformer 1 in three dimensions, producing it in successive layers L1, L2, L3, etc., with each layer being obtained for example by taking to its melting point a metal powder, in this case based on steel, by means of a laser or a bundle of electrons, according to a pattern which corresponds to that of the corresponding portion of preformer 1, then allowing the melted area to solidify such as to allow the material to agglomerate. A similar process of agglomeration by local melting then cooling is repeated in order to add the following layer, and so on.

Advantageously, additive manufacturing makes it possible in particular to produce rapidly and efficiently, at a low cost, and with little material, non-demouldable forms, as is the case here for the part of the stiffener 20 which is incorporated in the second channel 12, between the partitions 15, 16.

Production by additive manufacturing can give rise to certain specific arrangements of the form of the preformer 1.

Thus, in particular, if it is considered that manufacture by layers is carried out by stacking the successive layers L1, L2, L3 in the direction of flow X1, and thus starting with a first layer L1 which corresponds to the upstream face of the preformer 1 (in this case more particularly the upstream face 1U of the downstream preformer 1B which is then attached against the conjugated downstream face of the upstream preformer 1A), then, as shown in FIG. 11, from the said upstream face 1U and preceding the leading edges 21 of the stiffeners 20, the preformer 1 can have stabilisation lugs 45 which are designed to form a stable support plumb with each stiffener 20; during manufacture, a support of this type advantageously provides a mount for the following layers which constitute the said stiffener 20.

Similarly, the alignment groove 42 can have a base with a form which is substantially triangular or in the form of an arch, as can be seen in FIG. 12, rather than a flat base, since the said base is obtained by superimposition of a plurality of layers, each of which progresses slightly cantilevered towards the centre of the groove 42 relative to the layers which precede it. In fact, in additive manufacturing, it is difficult, or even impossible, to produce directly in a single layer a lintel which would straddle in a straight manner, without bending, the complete height of the groove 42 (considered in the direction of stacking Z1).

Preferably, as has been indicated above, additive manufacturing is produced by successive layers L1, L2, L3, etc. created progressively in a direction of manufacture which corresponds to the direction of flow X1 starting from a base plane (in this case the aforementioned upstream face 1U) which is normal to the said direction of flow X1.

Preferably, at least part of the first partition 15 and/or at least part of the second partition 16 has inclination relative to the direction of flow X1, and thus relative to the direction of manufacture, typically such as to provide the preformer 1 with its globally converging form already referred to. Thus, the superimposition of the successive layers L1, L2, L3 forms steps 46 as illustrated in FIG. 13.

Preferably, the preformer 1 retains lastingly, i.e. permanently, including during its use in production, along these portions which are inclined in steps 46, an arithmetical roughness Ra which is between 4 μm and 30 μm, and which corresponds to the coarse additive manufacturing roughness defined by the said steps 46.

It will be noted that this arithmetical roughness Ra of between 4 μm and 30 μm will be able to be found in particular on the bottom surface 23 and the top surface 24 of the stiffener 20.

In fact, the inventors found that, unexpectedly, a residual coarse roughness of this type, although far greater than the conventional roughnesses usually implemented in extrusion, was perfectly admissible, since the said coarse roughness Ra in no way impeded the flow of the elastomer mixes, such that it was thus not necessary to attenuate by polishing the steps 46 obtained from the additive manufacturing. Thus, in particular, it is possible to dispense with the operations of finishing of the inclined surfaces of the preformer 1, which advantageously provides savings in terms of time and production cost.

The roughness Ra in this case will substantially depend on the thickness X_L of the layers L1, L2, L3, which are preferably identical in each layer, and for example are between 20 μm and 120 μm, as well as on the angle of inclination A15 of the partition concerned relative to the direction of flow X1 (or, in an equivalent manner in this case, on the angle which is complementary to the said angle of inclination A15, formed between the said partition 15 and the upstream face 1U).

Figure 14B:
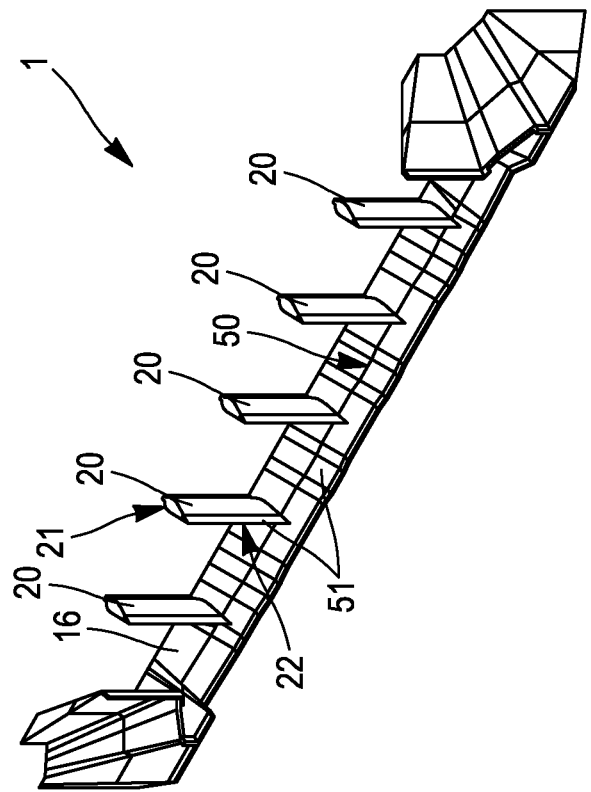
FIGS. 14A and 14B illustrate, in views respectively in perspective and from the front, the principle of production of a partition tip by shaving then addition of material on the downstream part of a preformer partition according to the invention.
Figure 14A:
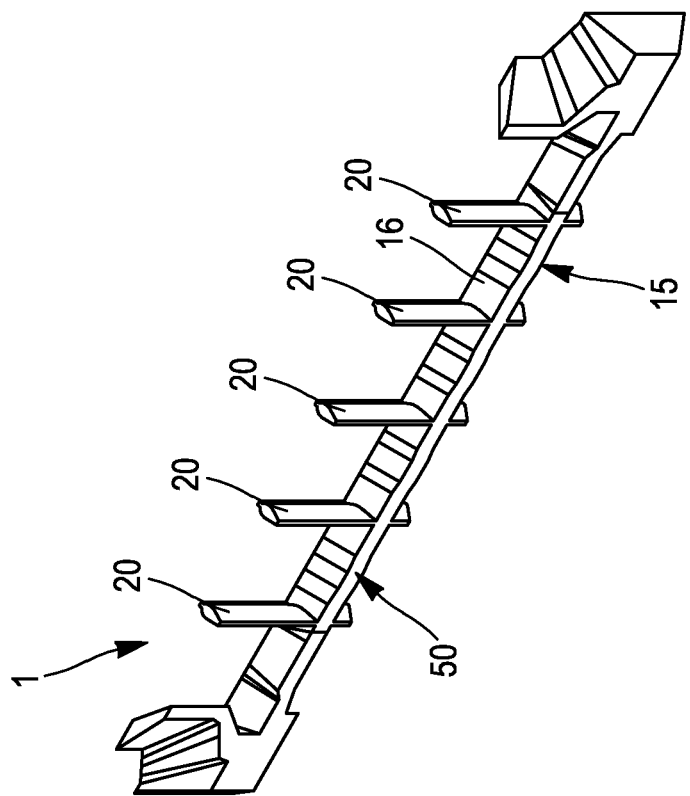

According to a possible implementation which can constitute a separate invention, applicable to any preformer 1 comprising at least one partition 15, 16, and whether or not the said preformer 1 comprises a stiffener 20 according to the invention, downstream ends of the first partition 15 and/or the second partition 16, in this case preferably the walls 15W, 16W described above, have a composite structure comprising firstly a permanent base 50 which forms an integral part of the partition 15, 16 concerned, and is produced at the same time as the partition 15, 16, and in this case at the same time as the stiffener 20, from the same original material as the said partition 15, 16, and secondly a tip 51 known as a "rechargeable tip" 51, which is obtained firstly by shaving the end of the partition 15, 16, in order to remove material therefrom, and thus form the permanent base 50, as illustrated in FIG. 14A, then adding material onto the said permanent base 50 in order to constitute a tip 51 which is attached to the said permanent base 50, which tip 51 thus projects in the downstream direction relative to the permanent base 50, in the direction of flow, as illustrated in FIG. 14B.

Thus, it is advantageously possible to develop the preformer 1, and more particularly to adjust precisely the length of the first and second partitions 15, 16, and more particularly the length of the walls 15W, 16W and the depth of the indentations 44 by means of an iterative process which is rapid and easy to implement, and wherein there take place in succession the operation of shaving, making it possible to shorten the partition 15, 16, then recharging with new material, making it possible to extend the partition 15, 16 to the required size.

Preferably, the preformer 1 is initially produced before shaving by additive manufacturing, as described above. Once the preformer has solidified, it is possible to extract it from the three-dimensional printing tooling, to test it within the extrusion head, then to modify it by removing material, for example by polishing, in the required locations at the ends of the partitions 15, 16, in order to form bases 50 which will act as a starting point for resumption of manufacturing.

Preferably, the recharging with new material in order to form the tip 51 is also carried out by additive manufacturing, by reintroducing the shaved preformer 1 into the three-dimensional printing tooling, such as to be able to resume additive manufacturing starting from the base 50.

It will also be noted that, as shown in FIGS. 14A and 14B, the shaving can also extend to a downstream portion of the stiffener(s) 20, such that the recharging with new material forming the tip 51 concerns not only a (downstream) part of the partitions 15, 16, but also a (downstream) part of the stiffener(s) 20.

It will be appreciated that the invention is in no way limited solely to the examples described in the foregoing, with persons skilled in the art being able in particular to isolate the aforementioned characteristics or combine them freely with one another, or to replace them by equivalents.

The invention claimed is:

1. A preformer configured to extrude jointly a plurality of elastomer mixes in a common direction of flow, in order to assemble the elastomer mixes into a co-extruded profiled element, the preformer comprising:
    superimposed in a stacking direction, the stacking direction being a first direction transverse to the common direction of flow, a first channel configured to convey a first elastomer mix, a second channel configured to convey a second elastomer mix, the second channel being separated from the first channel by a first partition, and a third channel configured to convey a third elastomer mix, the third channel being separated from the second channel by a second partition; and at least one stiffener which is formed integrally with the first partition and the second partition and extends to pass through at least the second channel in the stacking direction, wherein the at least one stiffener has, at least in a cross-section of passage of the second channel, a leading edge which allows the second elastomer mix to pass around the at least one stiffener by dividing into two sub-flows, which flow, in the second channel, on both sides of the leading edge.

2. The performer according to claim 1, wherein the at least one stiffener in a single piece also passes through at least one of the first and third channels, to have, in a cross-section of passage of the channel concerned, a leading edge which allows the elastomer mix following the channel concerned to pass around the at least one stiffener, splitting into two sub-flows which flow, in the channel concerned, on both sides of the leading edge, and thus on both sides of the at least one stiffener.

3. The performer according to claim 1, wherein the at least one stiffener extends in the common direction of flow between the leading edge and a trailing edge, to have, on both sides of the leading edge, respectively a bottom first flow surface and a top second flow surface, the bottom first flow surface and the top second flow surface each join the leading edge to the trailing edge, and wherein the at least one stiffener has a cross-section, delimited by the bottom first flow surface and the top second flow surface, which forms, relative to a chord which connects the leading edge to the trailing edge in a straight line, a biconvex profile.

4. The performer according to claim 3, wherein the cross-section of the at least one stiffener has an upstream bulge, such that the biconvex profile is thicker in an upstream half of the chord, on a leading edge side, than in a downstream half of the chord, on a trailing edge side.

5. The performer according to claim 1, wherein the at least one stiffener extends, in the stacking direction, from a first end plane to a second end plane, and wherein the first and the second end planes are inclined relative to the common direction of flow according to an orientation which makes the first and second end planes converge toward one another in a downstream direction of the flow, such that the first and second end planes can cooperate respectively with a first bevelled support face and a second bevelled support face of a box receiving the preformer, in order to ensure automatic centering of the preformer within the box, as well as retention of the preformer within the box in the common direction of flow.

6. The performer according to claim 1, wherein the first, second and third channels and consequently the first partition and the second partition extend in width in a lateral direction, the lateral direction being a second direction transverse to the common direction of flow and also being transverse to the stacking direction, and wherein the preformer comprises a plurality of stiffeners which are distributed to be spaced from one another in the lateral direction, each of the stiffeners being formed integrally with the first partition and the second partition and extending in the stacking direction, in order to pass through at least the second channel.

7. The performer according to claim 1, wherein the first, second and third channels and consequently the first partition and the second partition extend in width in a lateral direction, the lateral direction being a second direction transverse to the common direction of flow and also being transverse to the stacking direction, and wherein the preformer is split in the lateral direction into a plurality of individual modules which each comprise a portion of the width of the first partition and a portion of the width of the second partition and consequently a portion of the width of the first channel, the second channel, and the third channel, wherein the individual modules abut in pairs, reversibly, edge to edge, in the lateral direction, and wherein at least one individual module comprises at least one stiffener formed integrally with the portion of the first partition and the portion of the second partition of the at least one individual module.

8. The performer according to claim 7, wherein the individual modules abut according to joining planes placed obliquely, such that, in projection on the plane formed by the common direction of flow and the lateral direction, the joining planes each form a non-zero yaw angle relative to the common direction of flow, so that the individual modules block one another in the common direction of the flow.

9. The performer according to claim 7, wherein the individual modules each have an alignment groove which extends from one edge to the other of the individual module concerned in the lateral direction, such that the individual modules can be aligned on a single common key engaged in a series of alignment grooves.

10. The performer according to claim 1, wherein, measured in the stacking direction, the first partition has a thickness between 3 mm and 30 mm, the second partition has a thickness between 3 mm and 30 mm, or both the first partition and the second partition have thicknesses between 3 mm and 30 mm.

11. The performer according to claim 1, wherein the first partition and the second partition have at least one set-back at which the second channel and the third channel are both turned down toward the first channel in the stacking direction to be able to form a longitudinal furrow in an extruded profiled element which is configured to form a tread for an outer casing, and wherein the at least one stiffener extends in the second channel and the third channel, vertically aligned with the at least one set-back.

12. The performer according to claim 1, wherein an assembly in a single piece formed by the first partition, the second partition and the at least one stiffener is obtained by additive manufacturing.

13. The performer according to claim 12, wherein the additive manufacturing is produced by successive layers created progressively in a direction of manufacture which corresponds to the common direction of flow starting from a base plane which is normal to the common direction of flow, wherein at least part of the first partition, at least part of the second partition, or at least a part of both the first and second partitions have inclination relative to the common direction of flow, and thus relative to the direction of manufacture, such that superimposition of the successive layers forms steps, and wherein the preformer retains permanently, along the parts inclined in steps, an arithmetical roughness Ra which is between 4 μm and 30 μm, and which corresponds to coarse additive manufacturing roughness defined by the steps.

14. The performer according to claim 1, wherein downstream ends of the first partition, the second partition or both the first and second partitions have a composite structure comprising a permanent base, which forms an integral part of the partition concerned and is produced at the same time as the partition concerned and the at least one stiffener from a same original material as the partition concerned, and a rechargeable tip, which is obtained by shaving an end of the partition concerned, in order to remove material therefrom, and thus form the permanent base, and then adding material onto the permanent base in order to constitute the rechargeable tip which is attached to the permanent base, the rechargeable tip thus projecting in the downstream direction relative to the permanent base, in the common direction of flow.

15. The performer according to claim 1, wherein the at least one stiffener extends in a single piece beyond the second channel, through at least one of the first and third channels, and wherein different component portions of the at least one stiffener, which appear in the channels concerned and form a leading edge in the cross-section of passage of the channels concerned, have a cylindrical form which is generated by a constant base cross-section, which, through the different channels concerned, sweeps a single straight generatrix parallel to the stacking direction.

* * * * *